United States Patent [19]

Weiland et al.

[11] 4,448,131
[45] May 15, 1984

[54] SUSPENSION SYSTEM FOR RAIL VEHICLES

[75] Inventors: Emil Weiland, Hohenbrunn; Christian Günther, Haar, both of Fed. Rep. of Germany

[73] Assignee: Messerschmitt-Bölkow Blohm Gesellschaft mit beschrankter Haftung, Munich, Fed. Rep. of Germany

[21] Appl. No.: 218,693

[22] Filed: Dec. 22, 1980

[30] Foreign Application Priority Data

Dec. 22, 1979 [DE] Fed. Rep. of Germany ....... 2952182

[51] Int. Cl.³ ............................................... B61F 5/52
[52] U.S. Cl. .................................... 105/182 R; 267/3; 267/41; 267/148; 280/686
[58] Field of Search .................... 105/157 R, 165, 167, 105/182 R, 197 R, 197.1, 197.2; 267/3, 41, 148, 149; 280/679, 680, 684, 686

[56] References Cited

U.S. PATENT DOCUMENTS

| | | | |
|---|---|---|---|
| 2,002,152 | 5/1935 | Le Moon | 267/41 |
| 3,896,740 | 7/1975 | Kreissig | 105/184 X |

FOREIGN PATENT DOCUMENTS

| | | | |
|---|---|---|---|
| 456070 | 3/1973 | Australia | 105/182 R |
| 31008 | 7/1981 | European Pat. Off. | 105/182 R |
| 1164757 | 7/1959 | Fed. Rep. of Germany . | |
| 826887 | 1/1960 | United Kingdom | 105/182 R |
| 2021731 | 12/1979 | United Kingdom | 267/149 |

*Primary Examiner*—Randolph Reese
*Attorney, Agent, or Firm*—Toren, McGeady and Stanger

[57] ABSTRACT

A suspension system for rail vehicles which have at least two wheelsets having axles which are supported in a frame and within which a cross member extends parallel to the axles. The cross member is supported in the vehicle frame in a spring-cushioned manner wherein the frame with the integrated cross member consists essentially of an H-shaped part made of resiliently elastic fiber-reinforced material.

5 Claims, 5 Drawing Figures

SUSPENSION SYSTEM FOR RAIL VEHICLES

The present invention relates generally to rail vehicles and, more particularly, to a truck for rail vehicles wherein at least two wheelsets are provided having axles which are supported in a frame within which there is integrated a cross member which is parallel to the axles. The cross member supports the vehicle frame in a spring-cushion manner.

Trucks for rail vehicles are known wherein the wheelset axles are held on the frame of the truck by means of a spring suspension system which acts primarily vertically and in the direction of travel. The vehicle frame is connected to the truck over a secondary spring suspension which is provided at the center of the frame. In a truck having this construction, a disadvantage arises in that the force must be deflected from the two wheel support points to the centrally arranged secondary suspension. This creates a significant limitation with regard to the degree to which the weight of the construction of the truck frame may be reduced.

As an alternative, directly suspended wheelsets are used in which the truck frame has only a positioning function in order to improve the ability of the vehicle to negotiate curves. The wheelsets are directly connected to the vehicle frame through secondary springs. Such a truck frame is relatively simple to construct but the compensating effect of the truck relative to a vertical fault of the rail is, however, lost.

In order to reduce the requirements imposed upon the wheelset systems and to improve the weight reduction characteristics of the truck, creep-controlled wheelsets have been used (see German Pat. 26 14 166 and U.S. Pat. Nos. 961,375 and 1,460,962).

The task to which the present invention is related is the provision of a truck of the type described above having a frame whose weight may be reduced to a minimum and which simultaneously facilitates a jointless connection of the wheels with the cross member and a vertical spring suspension and a roll or rolling spring suspension of the wheelsets including the positioning of the wheelsets.

SUMMARY OF THE INVENTION

Briefly, the present invention may be described as a truck for rail vehicles having at least two wheelsets whose axles are supported in a frame within which a cross member extends parallel to the axis, the cross member supporting the vehicle frame in a spring-cushion manner wherein the frame consisting of said integrated cross member is essentially formed as an H-shaped part of resiliently elastic fiber-reinforced material.

The construction of the spring elements of elastic fiber-reinforced material is known from German Auslegeschrifts 11 64 757 and 11 39 703, corresponding, respectively, to U.S. Pat. Nos. 2,969,971 and 3,219,333. The H-shaped part according to the invention can be produced with the required spring properties in view of the known fiber-reinforced spring materials. As indicated, the fiber-reinforced materials which may be used with the present invention are such that they are within the knowledge of those skilled in the art, and other references disclosing such materials are U.S. Pat. Nos. 3,466,219, 3,470,051, and 4,092,453.

A truck in accordance with the invention has the advantage that it is substantially lighter than trucks of the prior art, that it facilitates a jointless connection of the wheelsets with the cross member portion, and that it simultaneously ensures a vertical spring suspension and a rolling spring suspension of the wheelsets including the positioning of the wheelsets. The wheelsets are directly connected to the truck frame through the axle suspension. As a result, aside from the conventionally utilized primary suspension system which is assumed by the H-shaped part, a longitudinally elastic axle attachment is also not required.

The desired spring properties are especially advantageous when the cross-sectional area of the arms of the H-shaped member acting on the axles increases toward that portion which corresponds to the cross member.

Advantageously, the portion of the H-shaped part corresponding to the cross member is structured relatively rigidly from fiber-reinforced material because this portion supports the secondary spring suspension between the truck and the vehicle frame which conventionally consists of two laterally stable pneumatic spring bellows with parallel hydraulic shock absorbers.

In a specific embodiment of the truck in accordance with the invention, the arms of the H-shaped part acting on the axles are bent downwardly starting from the portion of the vehicle frame corresponding to the cross member. In this case, the arms of the H-shaped part may act on the axles on the side of the axles facing toward the running surface consisting, for example, of rails. As a result of the downwardly bent ends of the H-shaped part, a passive rail adjustment of the wheelsets in curves will result from the centrifugal forces and, thus, an improvement in the guidance of the vehicle can be achieved. The resulting slight relative rotation of the axle supports in the respective axle can be facilitated by rubber torsion elements which simultaneously effect primary damping of the wheelsets together with the frame of fiber-reinforced material. Should this internal damping be found insufficient, additional damping elements can be installed.

Between the wheelset axles and the vehicle frame, preloading loading elements may be arranged which are adjustable by means of an appropriate control. The preloading loading elements have a pressure coupling on each side of the truck in order to prevent disturbances, which may be caused by truck hunting motions, from being transmitted to the vehicle frame.

The control consists of an initial loading and force compensating regulator which receives as input signals the excess transverse accelerations of the car body, the resulting aerodynamic forces and moments on the car body and the service load. The control will compute therefrom the pressures in the initial loading elements required for the reaction forces and moments so that the average value of the position of the vehicle frame or of the car body with respect to the truck will be maintained, thereby constituting achievement of active stabilization.

An additional feedback of the vehicle frame position relative to the truck facilitates its adjustment to desired position values which are defined by the admissible values of the excess transverse accelerations on the car body during travel through curves. Accordingly, the car body or the vehicle frame is turned about its longitudinal axis by the preloading loading elements with distance feedback until the free transverse acceleration perceptible by a passenger has fallen below the given values, i.e., an inclination compensation is achieved. A hunting compensation is not necessary in the case of a central position of the pneumatic springs. However, the wheel support forces should be completely introduced into the frame. Instead of or in connection with pneumatic springs, it is also possible to use power controlled hydraulic elements.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
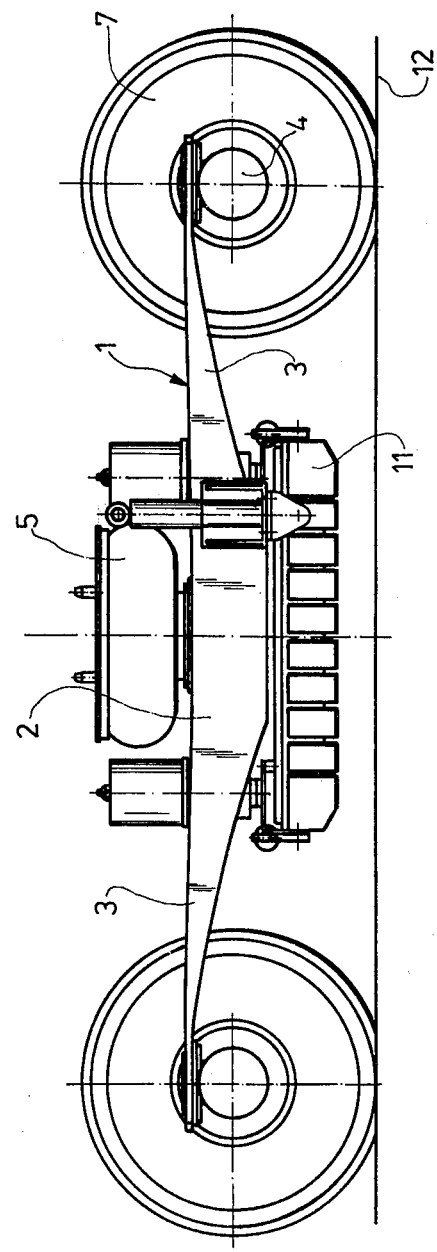
FIG. 1 is a schematic side elevation a first embodiment of a truck having a suspension in accordance with the present invention.

An embodiment of a truck suspension system in accordance with the invention, as illustrated in the drawings, will include two wheel axles 4 upon which wheels 7 are mounted. The wheels 7 are adapted to travel upon rails 12 and each axle 4 includes a slip clutch.

The truck includes a frame 1 which is formed in an H-shaped configuration from fiber-reinforced material and which is constructed to be comprised of a cross member portion 2 and arms 3. The cross member portion 2 is structured of a relatively rigid construction and the arms 3 narrow from the cross member portion 2 toward the wheelset suspensions. The H-shaped frame member 1 assumes the task of the primary spring suspension of the vehicle.

A connecting rod 6 arranged centrally of the cross member portion 2 assumes the transmission of acceleration and deceleration forces between the H-shaped member 1 and the vehicle frame (not shown). The braking of each axle 4 is effected by means of wheel disc brakes (not shown). An electromagnetic rail brake 11 is provided as an additional braking mechanism. The secondary spring suspension consists of two laterally stable pneumatic spring bellows 5 with parallel hydraulic shock absorbers which are arranged between the vehicle frame and the H-shaped member 1 on the cross member portion 2 in the region of the connection of the arms 3. The pneumatic spring bellows 5 assume the stabilization and support function of the vehicle frame. Auxiliary springs in the form of layered hollow block springs can be arranged within the pneumatic springs.

Figure 2:
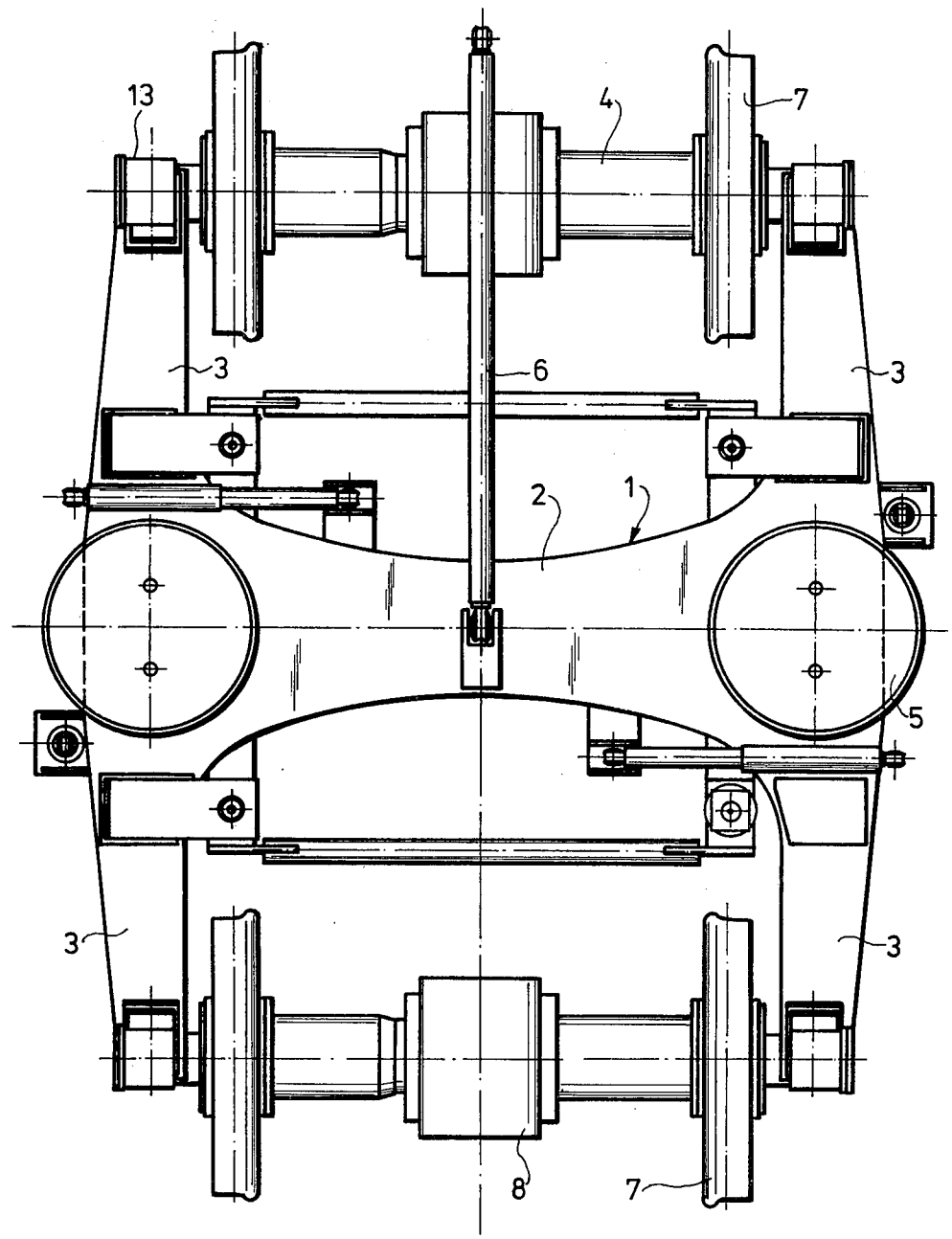
FIG. 2 is a top view of the truck depicted in FIG. 3.
Figure 3:
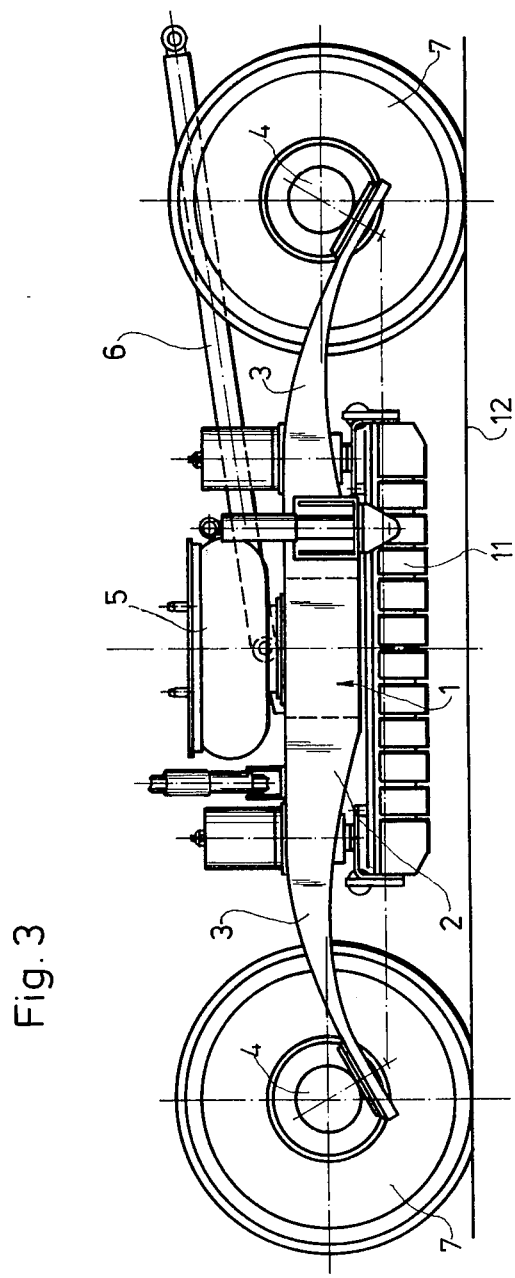
FIG. 3 is a schematic elevation of a second embodiment of a truck having a suspension in accordance with the present invention.

In the embodiment shown in FIG. 1, the arms 3 have the wheel axles 4 suspended therefrom with the arms 3 being located on the upper sides of the axles 4. However, in the embodiment according to FIGS. 2 and 3, the arms 3 are bent downwardly in a direction toward the rails 12 so that the respective wheel suspension provided by the arms 3 extends beneath the axles 4. This results in a passive radial adjustment of the wheels while traversing curves and thus provides improved guidance. As illustrated in FIG. 2, rubber torsion elements 13 can be provided for compensation of the twisting which occurs in the axle suspensions.

Figure 4:
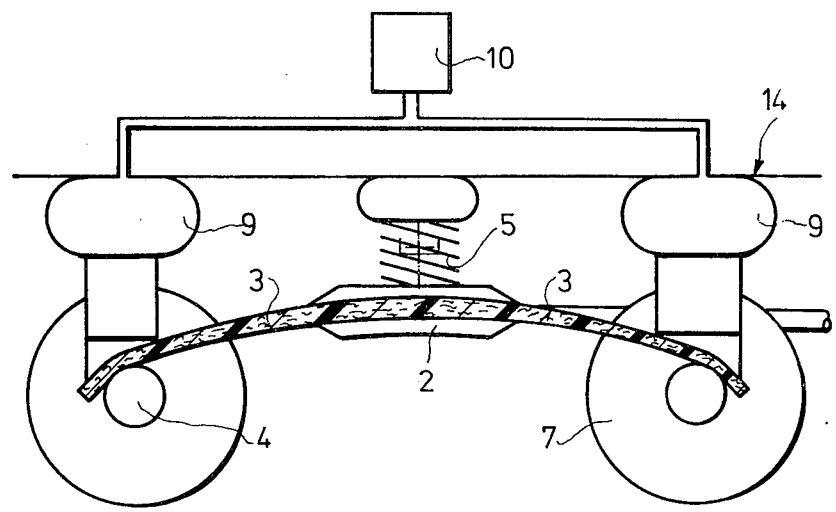
FIG. 4 is a schematic side elevation of a third embodiment of the invention.
Figure 5:
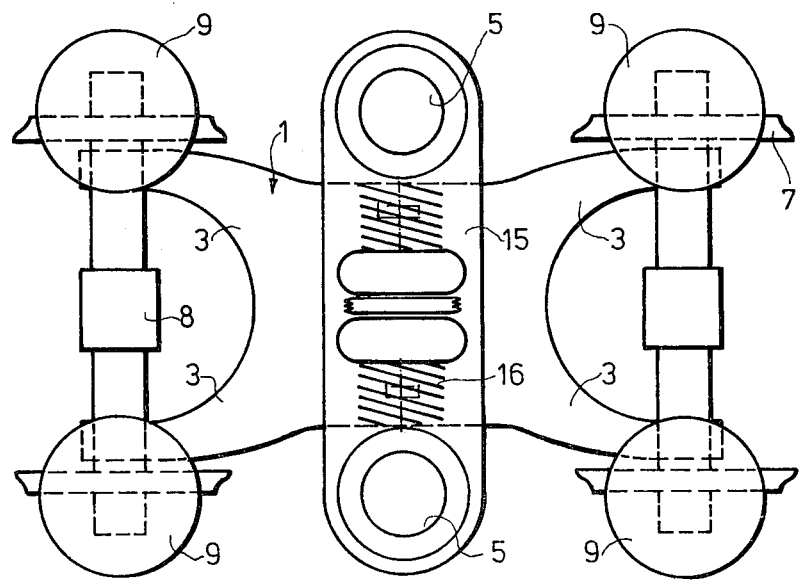
FIG. 5 is a top view of a truck in accordance with FIG. 4.

The embodiment illustrated in FIGS. 4 and 5 differs from the one illustrated in FIGS. 1 and 2 only in that preloading elements 9 are provided to each wheel and they are arranged between the vehicle frame 14 and the wheel axles 4. The preloading elements 9 are controlled by an preloading and force compensation regulator 10. In this embodiment, the cross member portion of the H-shaped frame member 1 is provided with a light metal bridge 15 which supports the secondary spring suspension and a transverse spring suspension 16.

Thus, in accordance with the invention, the frame and the primary spring suspension of a truck for a rail vehicle are replaced by an H-shaped part of fiber-reinforced material which assumes the tasks of both wheelset positioning as well as primary spring suspension of the wheelset. The secondary spring suspension can be supplemented by controllable preloading elements which are arranged directly above the wheelset bearings.

Due to the fact that the deflection of force is avoided in this truck and that an H-shaped part of fiber-reinforced material is used which assumes the double function of positioning and spring suspension of slip-controlled or rigid wheelsets, a substantial reduction in weight can be achieved. Additionally, the wheel support force variations are reduced which leads to lower loads on the structure of the rail vehicles which travel at high speeds.

While specific embodiments of the invention have been shown and described in detail to illustrate the application of the inventive principles, it will be understood that the invention may be embodied otherwise without departing from such principles.

What is claimed is:

1. A bogie for a rail vehicle comprising at least two wheel sets each consisting of an axle and a plurality of wheels and a bogie frame joining said wheel sets together in operative relationship, said bogie frame being formed with an H-shaped configuration consisting of a cross member and arm members extending therefrom, said arm members having attached at the ends thereof said wheel set axles, said bogie frame operating to provide the primary spring suspension means acting between said wheel set axles and said cross member to effect vertically resilient suspension of respective wheel set axles relative to said cross member, said bogie frame being constructed with said cross member and said arm members made completely of fiber-reinforced material joined together to form said bogie frame as a unitary member, with said cross member having a relatively rigid structure and with said arm members being formed with a more resilient structure taken relative to said cross member; said arm members being formed as integral units of fiber-reinforced material which function as said primary spring suspension means of said bogie; said fiber-reinforced structure of said bogie frame thereby functioning simultaneously as a frame member supporting said wheel sets maintaining them in guided relationship relative to each other and as the primary spring suspension means of said bogie.

2. A bogie according to claim 1 wherein the cross-sectional area of said arms increases from the ends thereof toward said cross member.

3. A bogie according to claim 1 wherein said arms are downwardly bent taken in a direction commencing from said cross member to said axles.

4. A bogie according to claim 1 wherein said arm members act on said axles on a side of said axles facing toward the running surface of said wheels.

5. A bogie according to claim 1 wherein said bogie further comprises preloading elements arranged thereon so as to enable them to be interposed between said wheel set axles and a rail vehicle upon attachment of said bogie frame to said vehicle.

* * * * *